(12) United States Patent
Killing et al.

(10) Patent No.: US 10,960,951 B2
(45) Date of Patent: Mar. 30, 2021

(54) BICYCLE HANDLEBAR ASSEMBLY WITH V-SHAPED STEM

(71) Applicant: PON BICYCLE I B. V., Almere (NL)

(72) Inventors: David Killing, Scarborough (CA); Jonathan Edward Max Strack, Toronto (CA); Robert James Pike, Caesarea (CA)

(73) Assignee: PON BICYCLE I B. V., Almere (NL)

(*) Notice: Subject to any disclaimer, the term of this patent is extended or adjusted under 35 U.S.C. 154(b) by 119 days.

(21) Appl. No.: 16/414,581

(22) Filed: May 16, 2019

(65) Prior Publication Data

US 2020/0055562 A1 Feb. 20, 2020

Related U.S. Application Data

(63) Continuation of application No. 16/103,061, filed on Aug. 14, 2018, now Pat. No. 10,293,879.

(51) Int. Cl.
| | |
|---|---|
| *B62K 19/32* | (2006.01) |
| *B62K 21/18* | (2006.01) |
| *B62K 21/04* | (2006.01) |
| *B62K 21/02* | (2006.01) |
| *B62K 21/12* | (2006.01) |
| *B62J 11/13* | (2020.01) |

(52) U.S. Cl.
CPC ............ *B62K 19/32* (2013.01); *B62K 21/125* (2013.01); *B62K 21/18* (2013.01); *B62J 11/13* (2020.02); *B62K 21/02* (2013.01); *B62K 21/04* (2013.01)

(58) Field of Classification Search
CPC ........ B62K 19/32; B62K 21/18; B62K 21/02; B62K 21/04
See application file for complete search history.

(56) References Cited

U.S. PATENT DOCUMENTS

| | | |
|---|---|---|
| 4,323,263 A | 4/1982 | Cook et al. |
| 4,676,120 A | 6/1987 | Borromeo |
| 4,729,255 A | 3/1988 | Moulton |
| 5,347,883 A | 9/1994 | Thöny |

(Continued)

FOREIGN PATENT DOCUMENTS

| | | |
|---|---|---|
| GB | 2543940 A | 5/2017 |
| WO | 2012/168781 A1 | 12/2013 |

*Primary Examiner* — Minnah L Seoh
*Assistant Examiner* — Michael R Stabley
(74) *Attorney, Agent, or Firm* — Kolitch Romano LLP

(57) ABSTRACT

A bicycle handlebar assembly comprises a base bar, a v-shaped stem selectively removable from the base bar, and a bicycle fork assembly. Control cables from the bicycle may be routed from the base bar into hollow diverging stem members of the v-shaped stem. The bicycle fork assembly comprises an external-steerer fork having a load-bearing member and a preload tensioning rod. The preload tensioning rod fits within a head tube of the bicycle, and a hollow space around the preload tensioning rod accommodates control cables passing from the v-shaped stem into a hollow portion of the bicycle frame. The v-shaped stem is secured against the base bar by a pair of nut plates. In some examples, an engagement portion of an accessory such as an aerobar extension assembly is configured to secure the v-shaped stem and an aerobar extension against the base bar.

17 Claims, 10 Drawing Sheets

(56) References Cited

U.S. PATENT DOCUMENTS

| | | | |
|---|---|---|---|
| 5,429,381 A * | 7/1995 | Mercat | B62K 19/16 |
| | | | 280/279 |
| 5,456,135 A | 10/1995 | Li | |
| 5,511,444 A | 4/1996 | Clausen et al. | |
| 5,749,590 A * | 5/1998 | Roerig | B62K 25/24 |
| | | | 280/276 |
| 5,758,548 A | 6/1998 | Smith | |
| 5,782,139 A | 7/1998 | Fraiman | |
| 6,003,890 A * | 12/1999 | Inouye | B62K 21/00 |
| | | | 280/270 |
| 6,092,438 A | 7/2000 | Soto | |
| 7,000,936 B2 | 2/2006 | Schmider | |
| 7,210,694 B2 * | 5/2007 | Trenne | B62K 21/18 |
| | | | 188/24.11 |
| 7,566,065 B2 | 7/2009 | Fukui | |
| 7,571,920 B2 * | 8/2009 | Lane | B62K 19/16 |
| | | | 280/274 |
| 7,891,687 B2 | 2/2011 | Schmider | |
| 7,976,045 B2 * | 7/2011 | Lane | B62K 19/16 |
| | | | 280/279 |
| 8,172,247 B2 | 5/2012 | Weber et al. | |
| 8,262,292 B2 * | 9/2012 | Hsieh | B62K 21/06 |
| | | | 384/545 |
| 8,438,946 B2 * | 5/2013 | Giroux | B62K 23/06 |
| | | | 74/551.5 |
| 9,056,646 B1 | 6/2015 | D'Aluisio et al. | |
| 9,415,825 B1 | 8/2016 | Salazar | |
| 9,446,812 B2 | 9/2016 | Nago | |
| 9,475,539 B2 * | 10/2016 | Ehrhard | B62K 21/00 |
| 9,533,731 B2 | 1/2017 | Meggiolan | |
| 9,701,293 B2 | 7/2017 | D'Aluisio et al. | |
| 9,862,450 B2 | 1/2018 | Meggiolan et al. | |
| 9,963,189 B2 | 5/2018 | Meggiolan et al. | |
| 10,737,740 B2 * | 8/2020 | D'Aluisio | B62K 21/04 |
| 2004/0089095 A1 | 5/2004 | Chiang | |
| 2006/0219045 A1 | 10/2006 | Schroeder et al. | |
| 2007/0151403 A1 | 7/2007 | Andrews et al. | |
| 2007/0241531 A1 | 10/2007 | D'Aluisio et al. | |
| 2010/0213684 A1 | 8/2010 | D'Aluisio | |
| 2011/0121538 A1 | 5/2011 | Giroux | |
| 2011/0133428 A1 * | 6/2011 | Hsieh | B62K 21/08 |
| | | | 280/276 |
| 2012/0297922 A1 | 11/2012 | Cote et al. | |
| 2013/0154234 A1 | 6/2013 | Shadwell | |
| 2015/0151809 A1 | 6/2015 | Li | |
| 2016/0339985 A1 | 11/2016 | Lund et al. | |
| 2018/0118300 A1 | 5/2018 | Lin | |
| 2018/0273132 A1 | 9/2018 | Huang | |

* cited by examiner

BICYCLE HANDLEBAR ASSEMBLY WITH V-SHAPED STEM

FIELD

This disclosure relates to bicycles. More specifically, the disclosed embodiments relate to bicycle handlebar assemblies.

INTRODUCTION

The handlebar assembly of a bicycle may affect many bicycle performance characteristics. For example, the stem, handlebars, and fork assembly of a bicycle may affect aerodynamic performance, stiffness, and/or handling precision. Handlebar assembly design may also affect the routing of bicycle control cables (e.g., shifter cables and brake cables) and the attachment of accessories to the front end of the bicycle. There is a need for a handlebar assembly that is an improvement in these areas over existing systems.

SUMMARY

The present disclosure provides systems, apparatuses, and methods relating to bicycle handlebar assemblies. In some embodiments, a bicycle handlebar assembly according to aspects of the present teachings comprises a base bar and a v-shaped stem selectively attachable to the base bar, including a pair of stem members diverging from a junction portion; each stem member having an aperture near a distal end configured to receive one or more control cables from a bottom surface of the base bar into a hollow interior of the corresponding stem member; and the junction portion of the stem having an aperture for routing the control cables from the stem members into a head tube portion of a bicycle frame.

In some embodiments, a bicycle handlebar assembly according to aspects of the present teachings comprises a base bar including means for routing bicycle control cables from shifter assemblies of the bicycle disposed at lateral edge portions of the base bar to a pair of spaced apart locations symmetrically disposed along a bottom surface of the base bar; and a stem including a pair of diverging stem members extending from a junction portion in a v-shaped configuration; wherein the stem is selectively attachable to the base bar, wherein each stem member has an aperture at its distal end which is configured to receive at least one of the control cables from a complementary one of the spaced apart locations into a hollow interior of the stem member, and wherein the junction portion of the stem has an aperture for routing the control cables from the stem members into a head tube portion of a bicycle frame.

In some embodiments, a bicycle handlebar assembly according to aspects of the present teachings comprises a base bar including grooves symmetrically disposed along a bottom surface of the base bar, each groove shaped to accommodate control cables of a bicycle, and each groove extending to a depression formed in the bottom surface of the base bar; a stem, selectively removable from the base bar, including a pair of diverging stem members extending from a junction portion in a v-shaped configuration, each stem member including a distal end configured to mate and align with one of the depressions formed in the bottom surface of the base bar, and the distal end of each stem member further including an aperture configured to receive control cables from one of the grooves of the base bar into a hollow interior portion of the corresponding stem member; and a pair of nut plate receiving apertures symmetrically disposed along a top surface of the base bar and each configured to receive either a retaining nut plate for securing one of the stem members to the base bar, or an attachment portion of an aerobar extension configured to secure the aerobar extension to the top surface of the base bar while also securing one of the stem members to the base bar.

In some embodiments, a bicycle handlebar assembly according to aspects of the present teachings comprises a base bar; a stem, selectively removable from the base bar, including a pair of hollow diverging stem members extending from a junction portion in a v-shaped configuration; means for routing control cables of a bicycle from the base bar and into the stem; and means for securing the stem to a bottom surface of the base bar; and means for selectively securing aerobar extensions to a top surface of the base bar.

Features, functions, and advantages of the present teachings may be achieved independently in various embodiments of the present disclosure, or may be combined in yet other embodiments, further details of which can be seen with reference to the following description and drawings.

DETAILED DESCRIPTION

Figure 1:
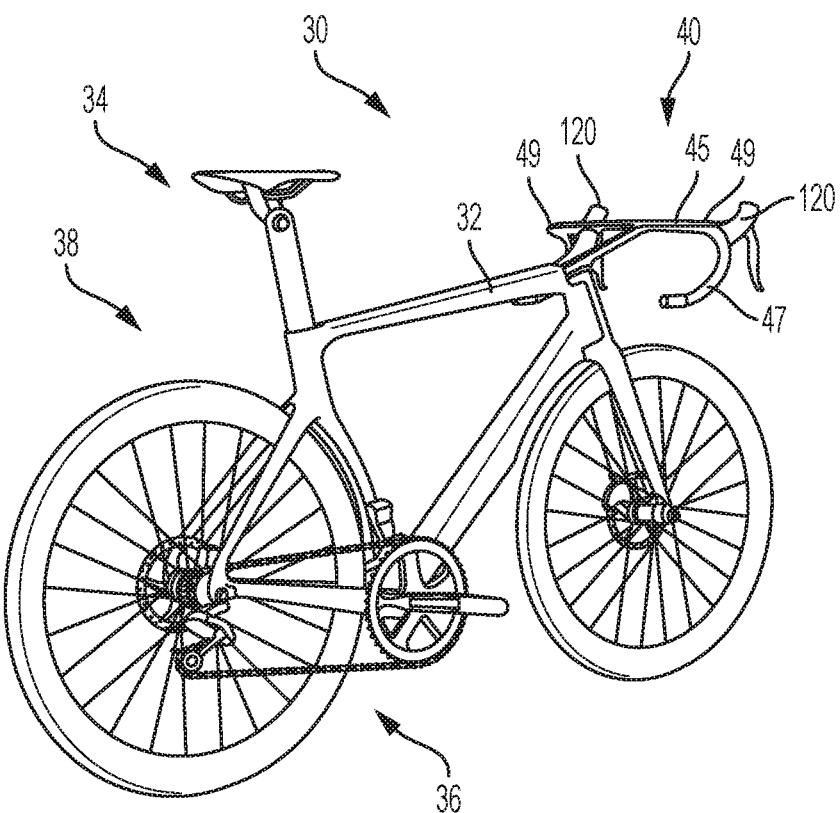
FIG. 1 is an isometric view of an illustrative bicycle in accordance with aspects of the present disclosure.

Various aspects and examples of a bicycle handlebar assembly including a v-shaped stem are described below and illustrated in the associated drawings. Unless otherwise specified, a handlebar assembly in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably (unless otherwise specified), whether directly or indirectly through intervening components.

Overview

In general, a bicycle handlebar assembly in accordance with the present teachings includes a base bar and a v-shaped stem selectively attachable to the base bar. The base bar, also called a handlebar, or in some cases a drop bar, supports bicycle control assemblies (e.g., shifters, brake levers, and/or the like). The v-shaped stem, in accordance with the present teachings, has two stem members diverging from a junction portion in a "v" or "v-shaped" configuration. A top surface of the base bar includes a pair of nut plate apertures, and the nut plate apertures are each configured to receive either a retaining nut plate for securing one of the stem members to the base bar, or an attachment portion of a bicycle accessory configured to secure the accessory to the base bar while also securing one of the stem members to the base bar. In some examples, the bicycle accessory comprises an aerodynamic handlebar extension, which may be referred to as an aerobar extension. Alternatively, or additionally, the bicycle accessory may comprise one or more lamps, reflectors, bicycle computers, mounts, bells, horns, and/or any other suitable device.

Each stem member has, near a respective end distal the junction portion, an aperture configured to receive bicycle control cables from the base bar. The cables may be routed from the base bar via the stem-member apertures into the v-shaped stem, and from the junction portion of the v-shaped stem into a head tube or other portion of the bicycle frame.

The bicycle handlebar assembly, in accordance with the present teachings, further may include a fork assembly. Typically, the fork assembly comprises an external steerer fork assembly, also called a bayonet-style fork assembly, configured to fit partially within a head tube portion of a bicycle frame. The fork assembly includes a load-bearing member disposed at a front surface of the fork assembly, a pre-load tensioning rod disposed along an axis of rotation of the fork assembly, a hollow portion disposed around the tensioning rod, and a top aperture configured to receive control cables from the v-shaped stem. The tensioning rod and associated hollow portion fit within the head tube portion of the bicycle frame, and the hollow portion accommodates the cables as they pass through the head tube portion. The cables may be routed along interior and/or exterior portions of the bicycle frame and/or fork blades to front and rear derailleurs, brakes, and/or other suitable bicycle components.

Examples, Components, and Alternatives

The following sections describe selected aspects of exemplary handlebar assemblies, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Bicycle

FIG. 1 depicts an illustrative bicycle 30, according to aspects of the present teachings. Bicycle 30 includes a bicycle frame 32 configured to support a seat assembly 34, a gear assembly (or drive train assembly) 36, wheel assemblies 38, handlebar assembly 40, and/or any other suitable bicycle systems. Bicycle frame 32 typically includes one or more hollow tubes comprising a metal material, an alloy material, a composite material, and/or other suitable material. For example, bicycle frame 32 may comprise steel, aluminum, carbon fiber, titanium, and/or the like. Gear assembly 36 may include one or more derailleur gear systems (e.g., including front chain rings, a rear cassette, and front and rear derailleurs), hub gear systems, single-speed gear systems, and/or the like.

In the example depicted in FIG. 1, bicycle 30 comprises a road bicycle. Alternatively, or additionally, bicycle 30 may comprise characteristics and/or systems suitable for touring bicycles, randonneur bicycles, hybrid bicycles, cyclocross bicycles, mountain bicycles, time trial bicycles, triathlon bicycles, BMX bicycles, cruiser bicycles, electric bicycles, motorized bicycles, and/or any other suitable type of bicycle.

B. Illustrative Handlebar Assembly

As shown in FIGS. 2-10, this section describes illustrative handlebar assembly 40 in more detail. Handlebar assembly 40 is an example of a handlebar assembly according to aspects of the present teachings.

Figure 2:
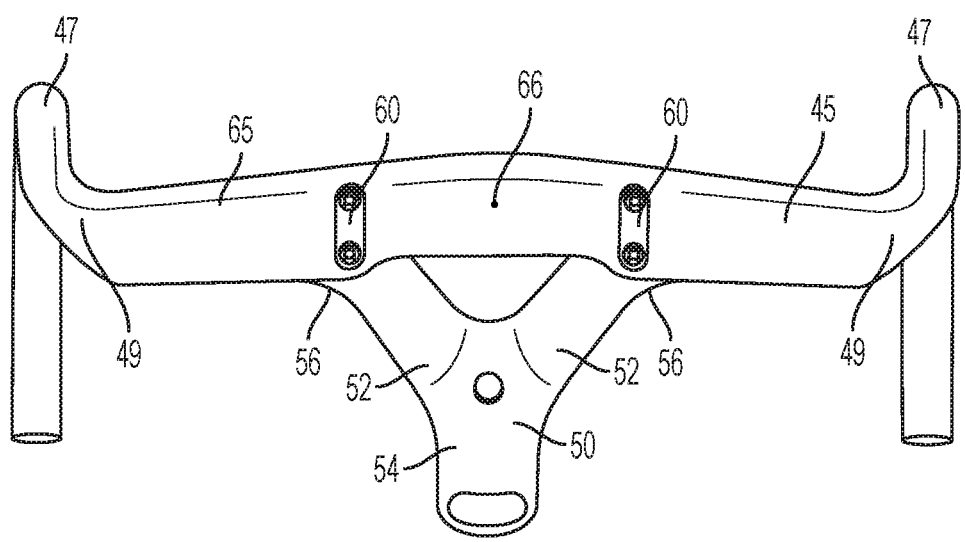
FIG. 2 is a top view of an illustrative base bar and v-shaped stem in accordance with aspects of the present disclosure.

FIG. 2 is a top view of an illustrative base bar 45 and v-shaped stem 50 of handlebar assembly 40. Base bar 45 is an elongate bar configured to support one or both hands of a person riding bicycle 30, and typically also to support control assemblies such as brake/shifter assemblies. In some examples, base bar 45 has curved bend portions 47 extending from lateral edge portions 49 of the base bar, in which case base bar 45 may be referred to as a drop bar or drop-style handlebar.

V-shaped stem 50 includes a pair of stem members 52 diverging from a junction portion 54. V-shaped stem 50 is selectively attachable to base bar 45. Typically, v-shaped stem 50 attaches to base bar 45 at or adjacent distal ends 56 of stem members 52, at a distal end of the stem relative to junction portion 54. Means for attaching v-shaped stem 50 to base bar 45 may include at least two nut plate apertures 60 disposed along a top portion 65 of the base bar. In the example depicted in FIG. 2, nut plate apertures 60 are disposed symmetrically along top portion 65 of base bar 45 (e.g., the nut plate apertures are disposed symmetrically about a base bar center point 66 located at a midpoint between lateral edge portions 49). Alternatively, nut plate apertures 60 may be disposed asymmetrically about center point 66.

In the example depicted in FIG. 2, a nut plate aperture 60 is disposed at each of two locations on either side of lateral center point 66 of base bar 45. In other examples, two or more nut plate apertures 60 may be disposed at each location. In some examples, unequal numbers of nut plate apertures 60 may be disposed at each location. The number of nut plate apertures may be selected based on a desired security of the connection between v-shaped stem 50 and base bar 45, a desired stress or load applied to the v-shaped stem, a desired weight for a retaining device received in the nut plate apertures, and/or other suitable factors.

In some examples, base bar 45 has one or more hollow interior portions underneath nut plate apertures 60, and the nut plate apertures allow access to the hollow interior portions. Alternatively, or additionally, base bar 45 may be solid in the vicinity of nut plate apertures 60, and the nut plate apertures may define bores extending from top portion 65 through the base bar.

Figure 3:
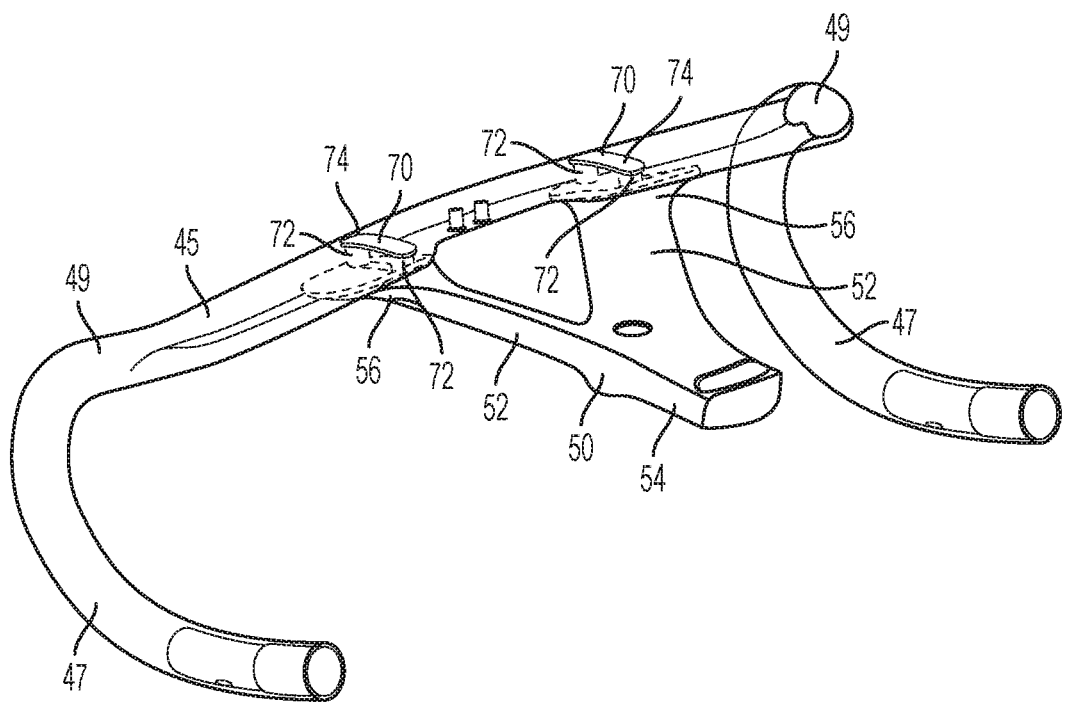
FIG. 3 is a semi-transparent isometric view of the base bar and v-shaped stem of FIG. 2, showing a pair of illustrative nut plates attaching the v-shaped stem to the bottom surface of the base bar.
Figure 4:
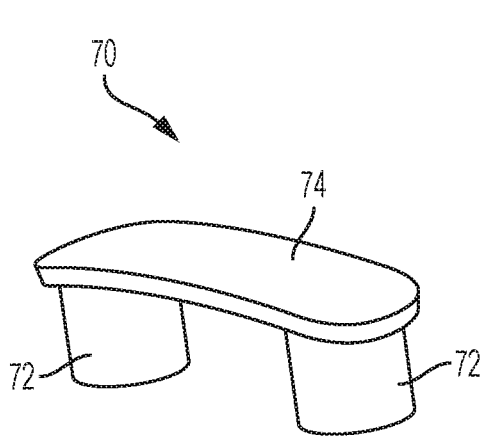
FIG. 4 is an isometric view of one of the nut plates of FIG. 3.
Figure 5:
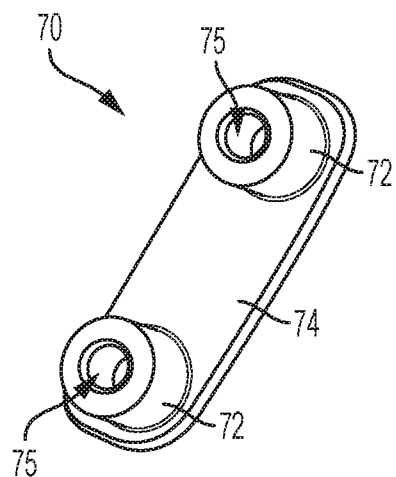
FIG. 5 is another isometric view of one of the nut plates of FIG. 3.

Nut plate apertures 60 are configured to receive respective nut plates 70 (see, e.g., FIGS. 3-5) for fastening v-shaped stem 50 to base bar 45. FIG. 3 depicts illustrative nut plates 70 received in respective nut plate apertures 60; FIGS. 4-5 are isometric views of an illustrative nut plate 70. Nut plate 70 typically includes at least one nut plate projection 72 protruding from a nut plate base 74. Nut plate projections 72 are each configured to fit within a complementary opening formed in one of the nut plate apertures 60. In the example shown in FIGS. 4-5, nut plate projections 72 include bores 75 each configured to receive a fastener. In some cases, bores 75 may be internally threaded. Bores 75 may extend through nut plates 70, such that the bores are accessible from above base bar 45, or may terminate below the nut plates (e.g., within nut plate projections 72), such that the bores are not accessible from above the base bar.

Typically, nut plates 70 secure v-shaped stem 50 to base bar 45 by retaining the v-shaped stem against an underside of the base bar, e.g. with bolts or other fasteners passing through apertures in the distal ends 56 of the stem and into projections 72 of the nut plates, thereby compressing the base bar between distal ends 56 and the nut plates.

Figure 6:
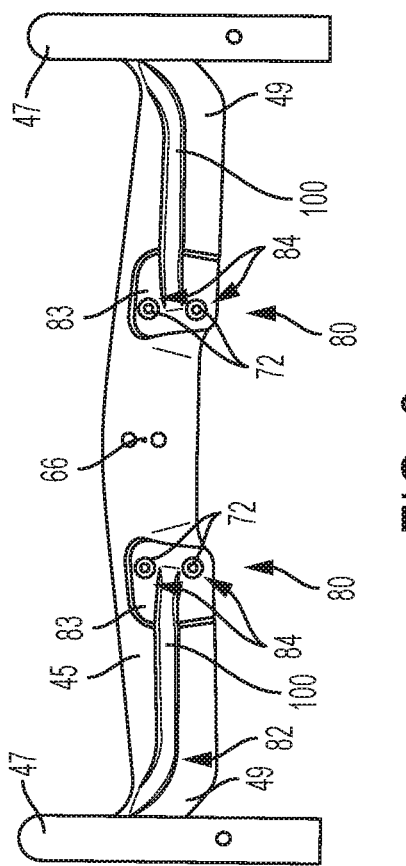
FIG. 6 is a bottom view of the base bar of FIGS. 2-3, shown without the v-shaped stem or nut plates.

FIG. 6 is a bottom view of base bar 45 illustrating two spaced-apart locations, generally indicated at 80, symmetrically disposed along a bottom surface 82 of the base bar. Spaced-apart locations 80 are typically disposed symmetrically about center point 66 of the base bar. A distance between spaced-apart locations 80 is typically substantially equal to a distance between distal ends 56 of stem members 52.

In general, spaced-apart locations 80 are configured to facilitate attachment of stem members 52 to base bar 45. In the example shown in FIG. 6, spaced-apart locations 80 each include a depression 83 in bottom surface 82 of base bar 45. Distal ends 56 of stem members 52 are configured to mate and align with depressions 83. The mating of distal ends 56 to depressions 83 helps to secure v-shaped stem 50 against base bar 45 (e.g., by tending to prevent rotation of the v-shaped stem relative to the base bar) and helps to ensure that the v-shaped stem and the base bar are properly aligned during attachment. In some cases, bottom surface 82 of base bar 45 may include relief portions rather than depressions to facilitate the alignment and attachment of v-shaped stem 50 with the base bar.

Figure 8:
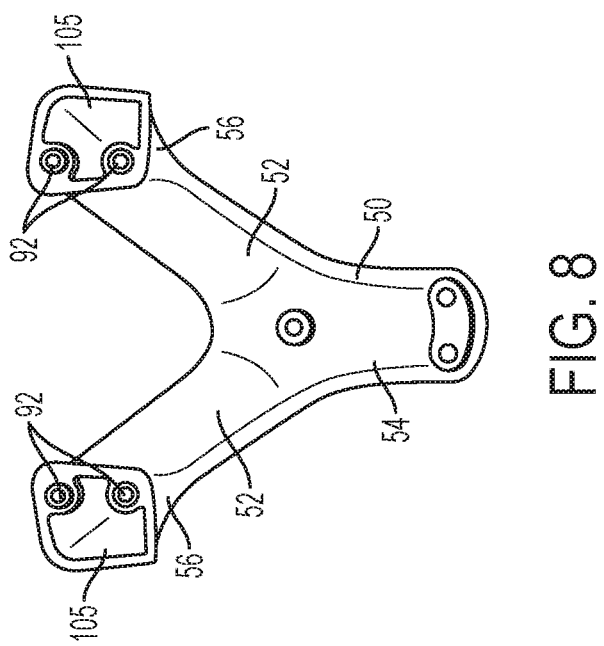
FIG. 8 is a top view of the v-shaped stem of FIGS. 2-3.
Figure 7:
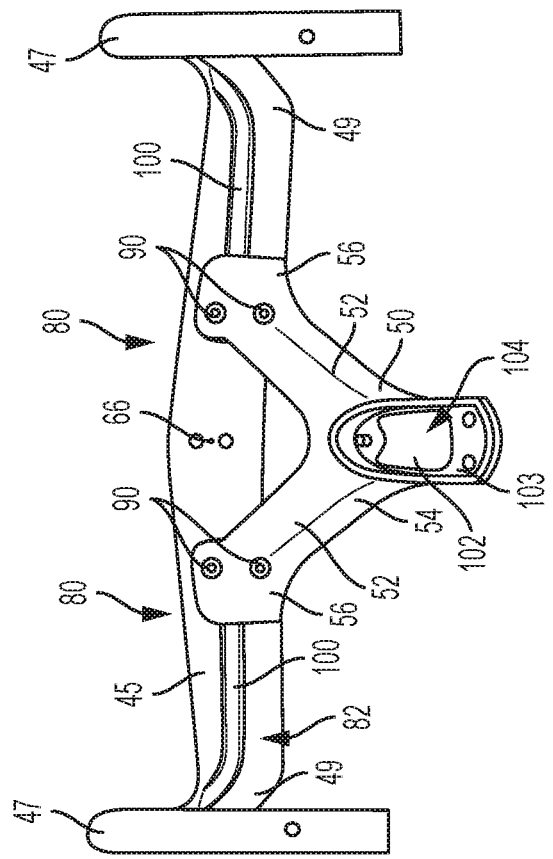
FIG. 7 is a bottom view of the base bar of FIGS. 2-3 with the v-shaped stem attached.

FIG. 7 is a bottom view of base bar 45 with v-shaped stem 50 attached, and FIG. 8 is a top view of v-shaped stem 50 depicting distal ends 56, which typically engage bottom surface 82 of base bar 45 when the v-shaped stem is attached to the base bar. Spaced-apart locations 80 each include means for one of the nut plates 70 to engage v-shaped stem 50 (e.g., to engage distal end 56 of one of the stem members 52).

In some examples, spaced-apart locations 80 include one or more bottom-surface apertures 84 in bottom surface 82. In the example depicted in FIGS. 6-8, bottom-surface apertures 84 in bottom surface 82 are aligned with nut-plate apertures 60 in top portion 65, such that nut-plate projections 72 pass through apertures 60 and into passages defined between nut-plate apertures 60 in top portion 65 and bottom-surface apertures 84 in bottom surface 82. Portions of nut-plate projections 72 distal nut-plate base 74 extend within the passages toward bottom-surface apertures 84 (e.g., substantially to bottom-surface apertures 84, and/or slightly above or below bottom-surface apertures 84).

Fasteners 90, such as bolts, retain v-shaped stem 50 against bottom surface 82 by passing through fastener apertures 92 within distal ends 56 and into bores 75 of nut-plate projections 72. Nut-plate bases 74 engage with top portion 65 of base bar 45 to retain nut-plate projections 72 within the passages defined between nut-plate apertures 60 and bottom-surface apertures 84. Nut-plate bases 74 also provide a smooth surface adjacent top portion 65 of the base bar for increased aesthetic appeal. For example, top portions of nut-plate bases 74 may be configured to be flush with adjacent portions of top portion 65, and/or may have a color and/or finish similar to a color and/or finish of the top portion.

In the example depicted in FIGS. 6-7, bottom surface 82 of base bar 45 has grooves 100 symmetrically disposed about center point 66 extending toward spaced-apart locations 80. Typically, at least one groove 100 extends from each lateral edge portion 49 of the base bar to one of the depressions 83. In the example shown in FIGS. 6-7, one groove extends from each lateral edge portion 49 to the nearest depression 83. Alternatively, or additionally, more than one groove 100 may extend from either or both lateral edge portions 49. In some examples, grooves 100 extend from one lateral edge portion 49 to the other lateral edge portion, forming one or more continuous grooves extending across bottom surface 82. In other examples, grooves may not be present.

As shown in FIG. 7, junction portion 54 of v-shaped stem 50 has a junction-portion aperture 102 in a lower surface 103 of the junction portion. Junction-portion aperture 102 allows access to a hollow interior portion 104 of v-shaped stem 50. Hollow interior portion 104 may include one or more hollow spaces, chambers, and/or channels defining a passage between junction-portion aperture 102 and distal ends 56 of stem members 52. In some examples, hollow interior portion 104 includes cable guide tubes extending from distal ends 56 to junction-portion aperture 102, and some or all of the interior of v-shaped stem 50 outside of the guide tubes may be solid or obstructed by other internal structure.

FIG. 8 is a top view of v-shaped stem 50 illustrating distal-end apertures 105 disposed at distal ends 56 of stem members 52 of the v-shaped stem. Distal-end apertures 105 are in fluid communication with junction-portion aperture 102 via hollow interior portion 104 of v-shaped stem 50. When v-shaped stem 50 is secured against base bar 45 by nut plates 70, as described above, grooves 100 of base bar 45 allow access from bottom surface 82 of the base bar to the interior of v-shaped stem 50 via distal-end apertures 105.

Figure 9:
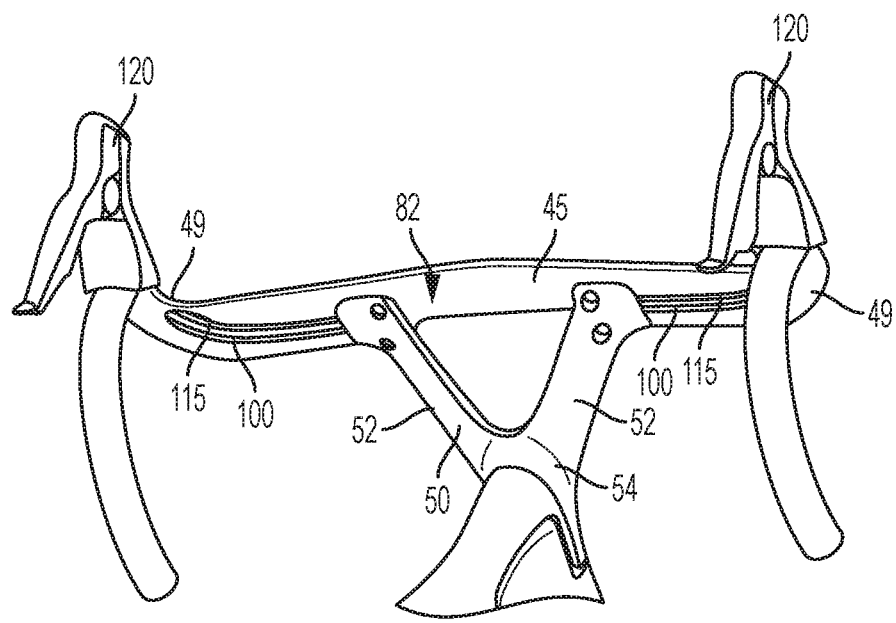
FIG. 9 is a bottom isometric view of a base bar and v-shaped stem attached to a bicycle frame and control assemblies, showing control cables of the bicycle routed along illustrative grooves in the base bar in accordance with aspects of the present disclosure.

As shown in FIG. 9, which is a bottom isometric view, control cables 115 are connected to shifter assemblies 120 disposed on base bar 45 at or near respective lateral edge portions 49. Shifter assemblies 120 may include any suitable actuators for bicycle control systems, including gear shifters, brakes, and/or the like. Cables 115 couple shifter assemblies 120 to the associated bicycle control system (e.g., a gearing system or a brake). In some cases, cables 115 may include wires encased in a housing. In other cases, cables 115 may be a hydraulic line. In still other cases, cables 115 may be configured to transmit electronic signals.

In the example shown in FIG. 9, cables 115 are routed along bottom surface 82 of base bar 45 via grooves 100. Routing cables 115 within grooves 100 helps to protect the cables from damage and from pressure, strain, and/or stress that may interfere with their function. Distal-end apertures 105 are each configured to receive bicycle control cables 115 from one of the grooves 100 into hollow interior portion 104 of v-shaped stem 50.

Alternatively, or additionally, base bar 45 may have one or more hollow interior portions, and cables 115 may be routed from shifter assemblies 120 to distal-end apertures 105 via hollow interior portions of the base bar. Apertures may be provided in surfaces of base bar 45 to allow cables 115 to enter the base bar (e.g., near shifter assemblies 120) and to exit the base bar (e.g., into distal-end apertures 105).

Figure 10:
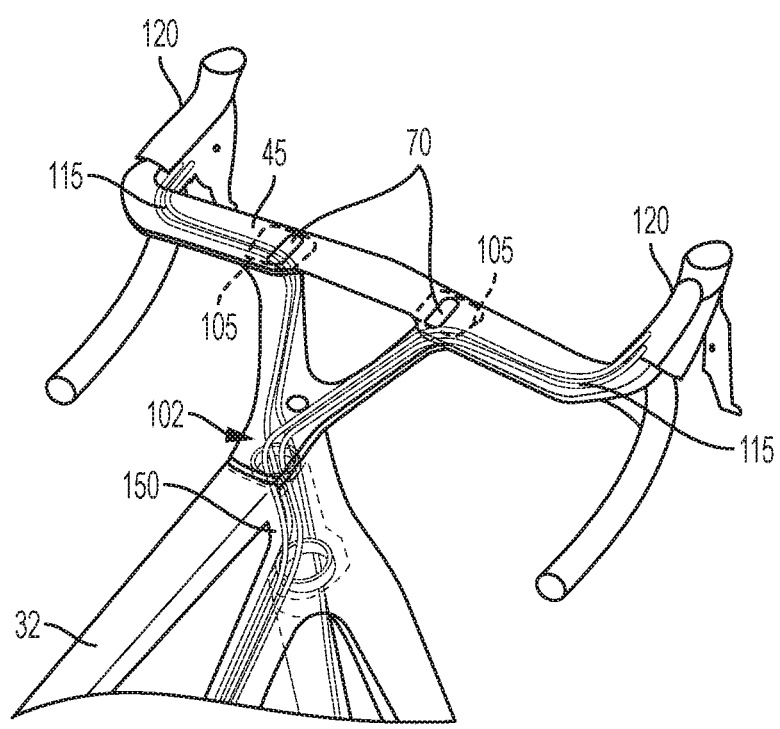
FIG. 10 is a semi-transparent top isometric view showing an illustrative routing of bicycle control cables from control assemblies, through a base bar and v-shaped stem, and into a bicycle frame, in accordance with aspects of the present disclosure.

FIG. 10 is a semi-transparent view depicting cables 115 routed from shifter assemblies 120, along grooves 100 (in bottom surface 82 of base bar 45, see FIG. 9), through distal-end apertures 105 and junction-portion aperture 102, and into head tube portion 150 of bicycle frame 32. Head tube portion 150 is discussed in conjunction with fork assembly 200 below.

C. Illustrative Fork Assembly

This section describes an illustrative fork assembly 200, as shown in FIGS. 11-16, according to aspects of the present teachings.

Figure 11:
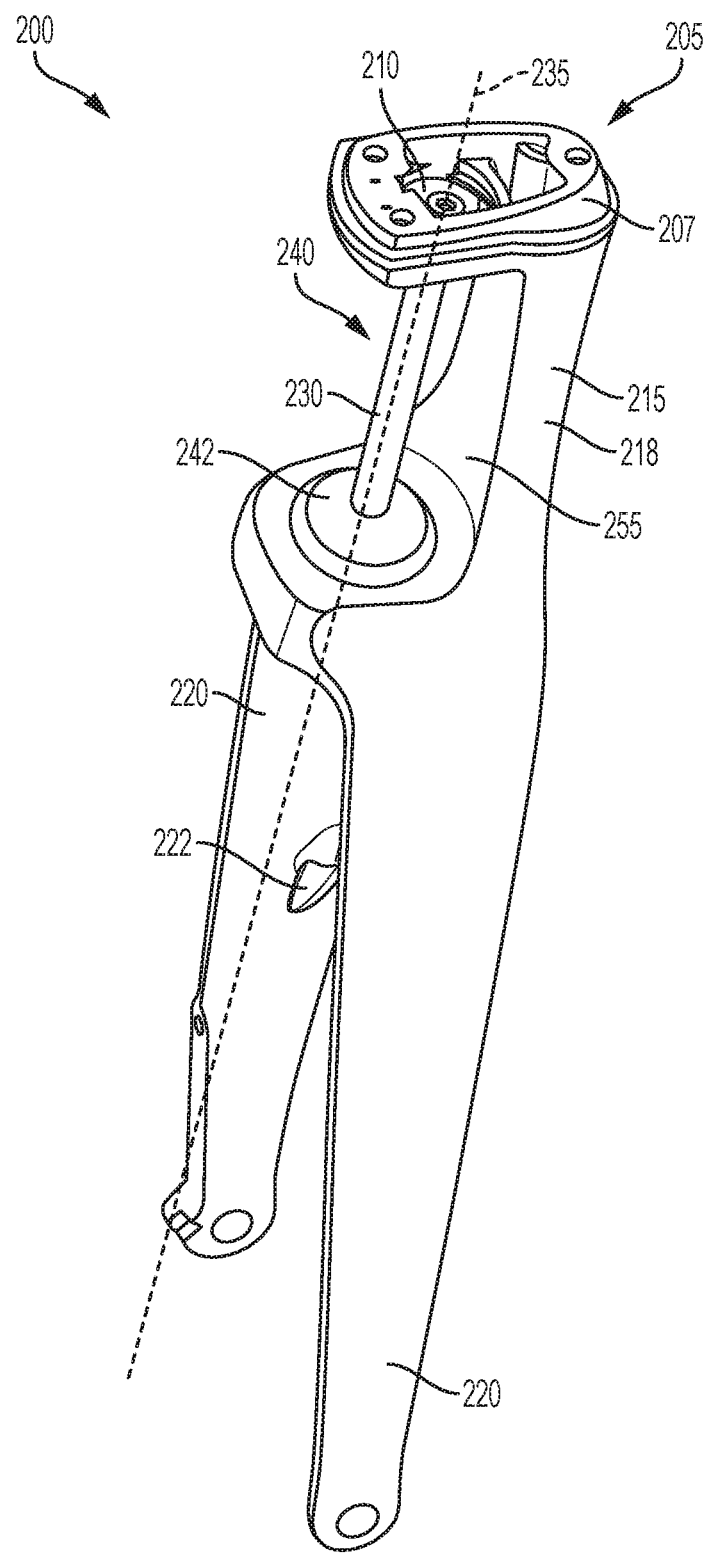
FIG. 11 is an isometric view of an illustrative fork assembly in accordance with aspects of the present disclosure.

As shown in FIG. 11, fork assembly 200 includes a fork top, generally indicated at 205, which is rigidly connectable to junction portion 54 of v-shaped stem 50. Typically, fork top 205 is configured to mate and align with junction portion 54. For example, fork top 205 may include recesses and/or projections (e.g., disposed on an upper surface 207) configured to mate with complementary recesses and/or projections of junction portion 54. Additionally, or alternatively, one or more fasteners may secure junction portion 54 to fork top 205 and/or to other components of fork assembly 200 and/or bicycle frame 32. Fork top 205 includes at least one top aperture 210 configured to receive cables 115 from v-shaped stem 50. Top aperture 210 is substantially aligned with junction-portion aperture 102 to facilitate passage of bicycle control cables through the apertures. Alternatively, or additionally, a preload insert may be positioned within top aperture 210 (see FIGS. 14-15 and associated description below).

Fork assembly 200 further includes a load-bearing member 215 (also called a load-bearing portion and/or a front load-bearing portion) disposed at a front portion of the fork assembly (e.g., at a fork front surface 218). Load-bearing member 215 extends between fork top 205 and one or more fork blades 220. One or more of fork blades 220 may be integral with load-bearing member 215. Load-bearing member 215 bears loads caused by, e.g. the weight of base bar 45 and/or pressure applied to the base bar by a rider of bicycle 30. Load-bearing member 215 also functions to steer the bicycle, by transmitting torque applied to the base bar by a rider to the fork blades, and thus to the front wheel of the bicycle. In this manner, load-bearing member 215 acts as an external steerer, and replaces the steering function of a more traditional steerer tube, which would be positioned inside a head tube of the bicycle.

Load-bearing member 215 and/or fork blades 220 may have hollow interiors. Hollow interiors of load-bearing member 215 and/or fork blades 220 may reduce the weight of bicycle 30 compared to a bicycle having a solid load-bearing member and/or solid fork blades, and/or may allow passage of cables 115. One or more of fork blades 220 may include at least one fork-blade aperture 222 configured to allow cables 115 to exit the fork blade and connect to a control assembly adjacent a front wheel of the bicycle, for example to control a disc brake.

Fork assembly 200 further includes a tensioning rod 230 (also called a preload rod, preload tensioning rod, and/or central tensioning rod) disposed behind load-bearing member 215. In the example depicted in FIG. 11, tensioning rod 230 extends substantially along an axis of rotation 235 of fork assembly 200, but in other examples, the tensioning rod may be offset from the axis of rotation, and/or may not be parallel to the axis of rotation. A hollow portion or space 240 adjacent tensioning rod 230 is configured to accommodate passage of cables 115. Tensioning rod 230 extends from a lower surface 242 of fork assembly 200 through space 240 toward fork top 205.

Figure 12:
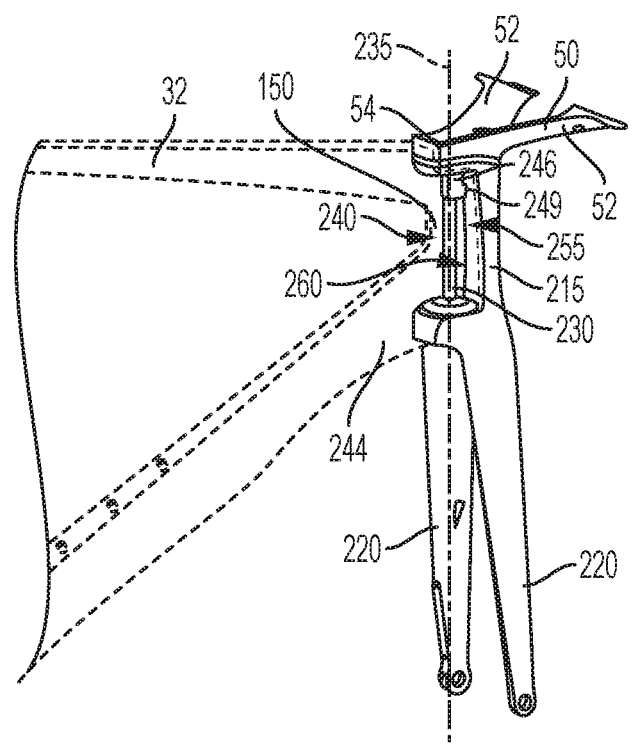
FIG. 12 is an isometric view of the fork assembly of FIG. 11 fitted partially within an illustrative bicycle frame portion and attached to a v-shaped stem, in accordance with aspects of the present disclosure.

As shown in FIG. 12, tensioning rod 230 and space 240 fit within head tube portion 150 of bicycle frame 32. Head tube portion 150 is sized such that space 240 within the head tube portion has sufficient volume to allow passage of cables 115. Typically, the volume within head tube portion 150 is sufficiently large that cables 115 may pass through freely, such that the functioning of the cables is not impeded by, e.g., pressure or tension from the head tube portion and/or from tensioning rod 230.

Figure 13:
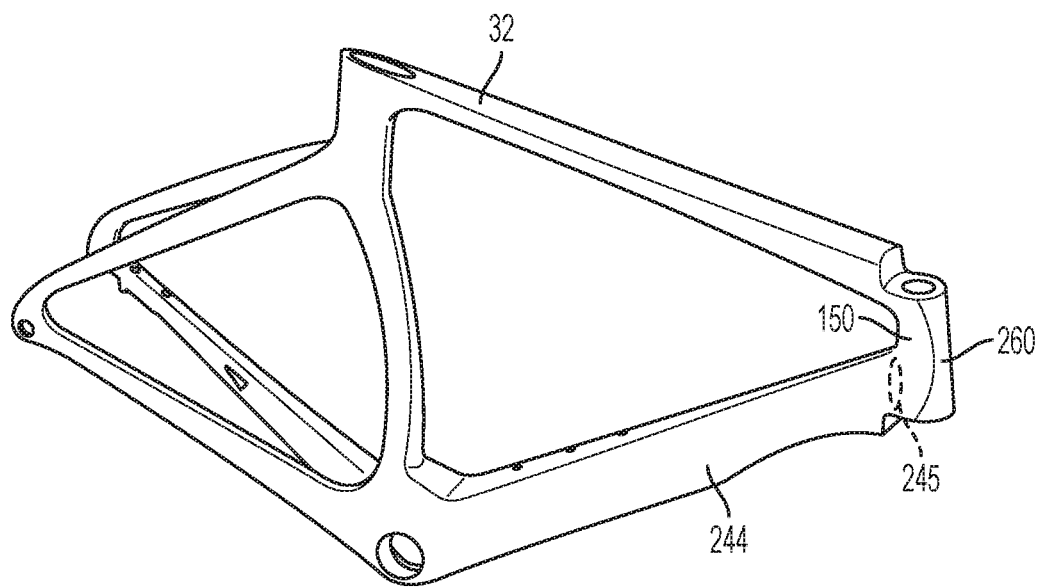
FIG. 13 is an isometric view showing a greater portion of the bicycle frame of FIG. 12.

From head tube portion 150, some or all of cables 115 may pass into hollow interior portion 244 of bicycle frame 32. For example, as illustrated in FIG. 13, an aperture 245 in head tube portion 150 may be configured to receive at least a subset of cables 115 into hollow interior portion 244. Alternatively, or additionally, the hollow interior of head tube portion 150 may be substantially contiguous with hollow interior portion 244.

Figure 14:
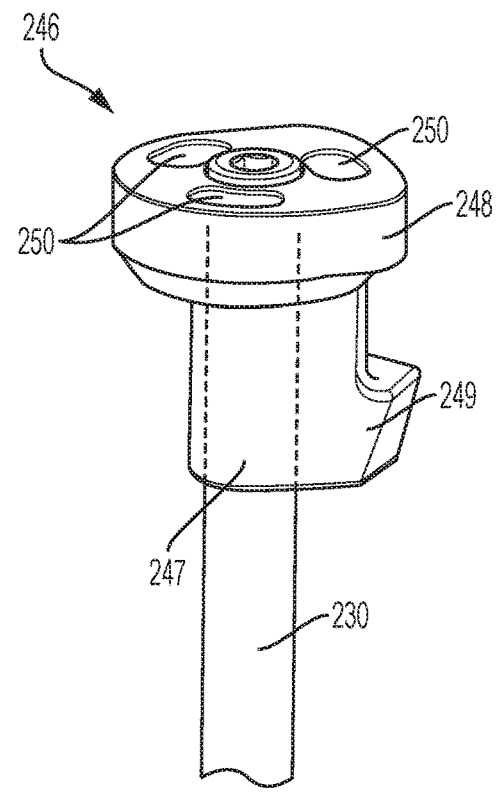
FIG. 14 is an isometric view depicting an illustrative preload insert, in accordance with aspects of the present disclosure.

FIG. 14 is an isometric view of an illustrative preload insert 246, which may be used in conjunction with fork top 205. Preload insert 246 is configured to preload headset bearings facilitating rotation of fork assembly 200 relative to head tube portion 150. Preload insert 246 is positioned on an upper end of tensioning rod 230. Typically, preload insert 246 has a bore 247 configured to receive an end portion of tensioning rod 230, such that the preload insert is positioned on top of the rod within fork top 205. An upper portion 248 of preload insert 246 includes apertures 250 configured to allow cables 115 to pass into head tube portion 150. Interchangeable preload inserts 246 having different types, sizes, shapes, and/or numbers of apertures 250 may be selectively mounted within fork top 205 to facilitate different cable routing configurations.

Preload insert 246 further includes a steering stop 249. Steering stop 249 projects from a side of preload insert 246 and is configured to limit the angular span over which the preload insert can rotate within head tube portion 150. For example, steering stop 249 may be sized and shaped such that the steering stop engages internal walls of head tube portion 150 when rotated to a predetermined position. Because base bar 45 and steering stop 249 rotate together, steering stop 249 prevents handlebar assembly 40 and fork assembly 200 from rotating far enough to contact frame 32, which could damage the bicycle. By preventing over-rotation of handlebar assembly 40 and fork assembly 200, steering stop 249 may also prevent cables 115 from being strained.

Figure 15:
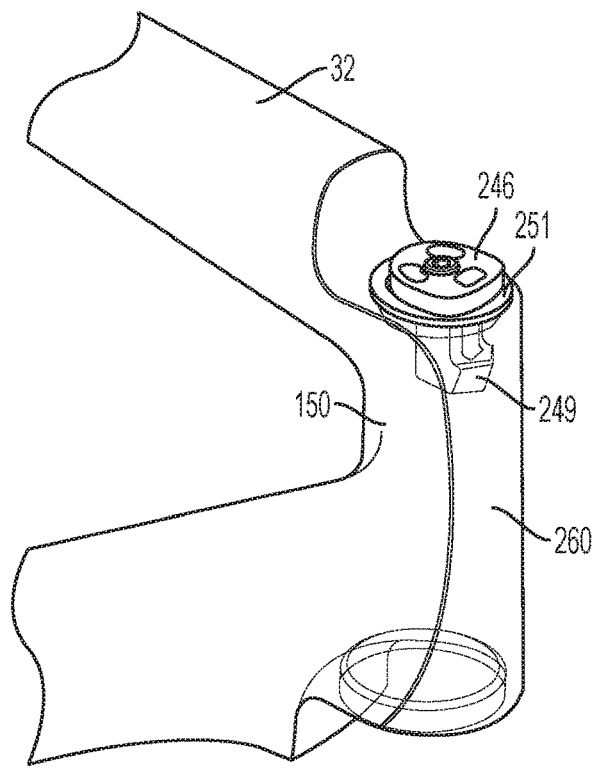
FIG. 15 is an isometric view showing the preload insert of FIG. 14 disposed on an illustrative bicycle bearing race.

FIG. 15 is an isometric view showing preload insert 246 positioned at the top of head tube portion 150. Upper portion 248 of preload insert 246 is disposed on an upper bearing race 251 and configured to apply a preload to the race. The preload may help to prevent upper bearing race 251 from skidding when fork assembly 200 rotates relative to bicycle frame 32 (e.g., when the bicycle is steered).

Preload insert 246 is typically secured within fork top 205 by screws, mating surfaces, clips, clamps, and/or any other suitable mechanism. In some examples, preload insert 246 is disposed within fork top aperture 210, and fork top 205 is configured such that the aperture may be tightened around the preload insert. In other words, fork top 205 may be configured to act as a pinch clamp.

Figure 16:
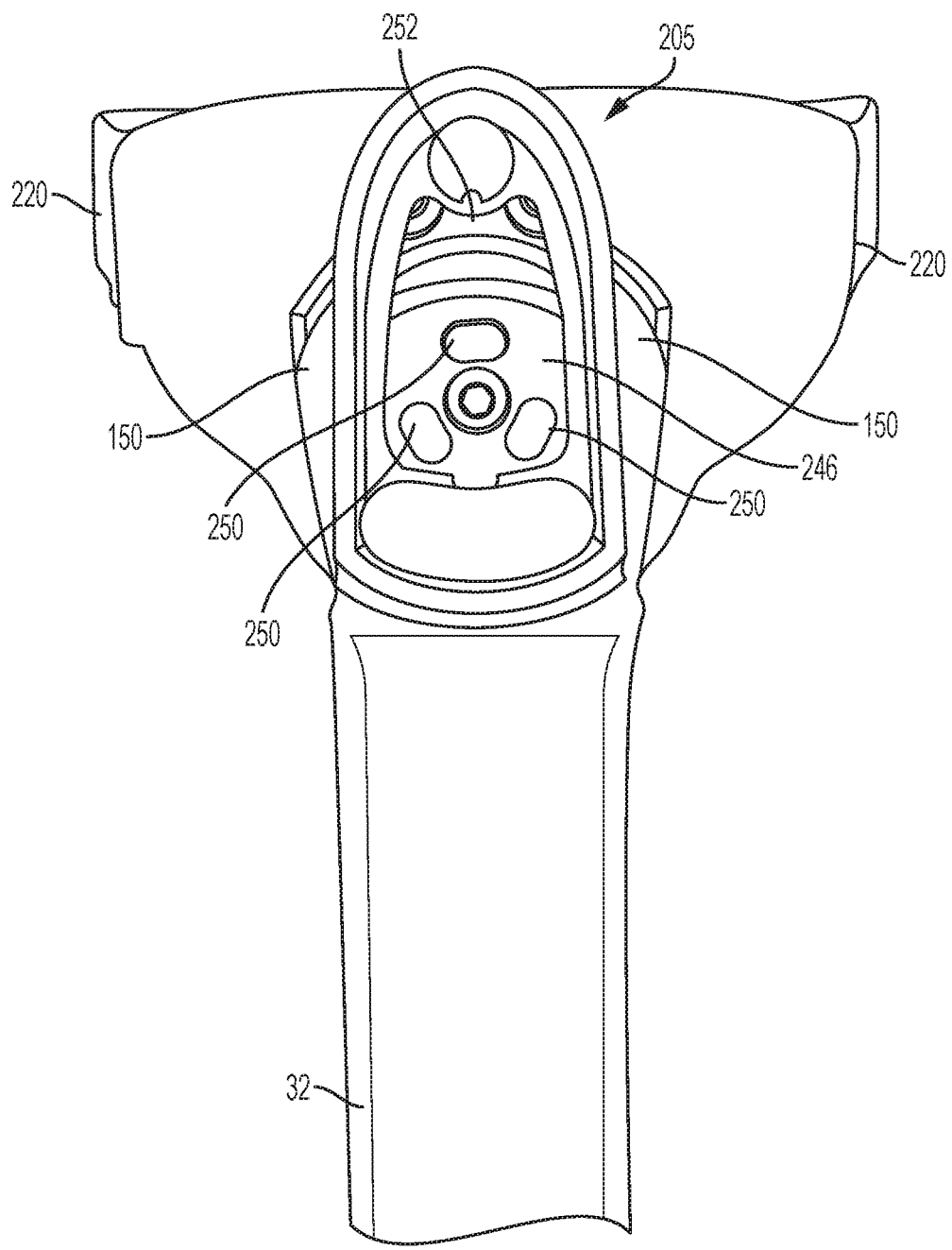
FIG. 16 is a top view of the fork assembly of FIG. 11, showing an illustrative fork top.

FIG. 16 is a top view of fork top 205 depicting illustrative preload insert 246 positioned within the fork top. In the embodiment depicted in FIG. 16, preload insert 246 includes three apertures 250 configured to receive cables 115 into space 240 within head tube portion 150. Fork top 205 includes a front top aperture 252 configured to receive one or more of cables 115 into a channel and/or hollow interior portion of load-bearing member 215. Cables 115 passing into load-bearing member 215 via front top aperture 252 may be routed through the load-bearing member into one or more fork blades 220, and may exit the fork blade through fork-blade aperture 222. Having exited fork blades 220 through fork-blade aperture 222, cables 115 may connect to a bicycle control system adjacent a front wheel of the bicycle, such as a disc brake.

The embodiment depicted in FIG. 16 may, for example, allow a cable for controlling a front brake of the bicycle to be routed through front top aperture 252, and three other cables to each be routed into head tube portion 150 through a respective one of the three exemplary preload insert apertures 250. In some examples, the three other cables include a rear brake cable, a rear derailleur cable, and a front derailleur cable. However, the example of FIG. 16 may be used in conjunction with a different number or different type of cables 115.

Fork assembly 200 is configured to rotate about head tube portion 150, e.g., in response to rotation of base bar 45. For example, a rider of bicycle 30 may rotate base bar 45 while turning the bicycle. Load-bearing member 215 and tensioning rod 230 rotate together about axis of rotation 235 (see FIG. 12). Tensioning rod 230 rotates within head tube portion 150, and load-bearing member 215 rotates external to any tubes of bicycle 30. As shown in FIGS. 12-13, a front surface 260 of head tube portion 150 has a shape complementary to a shape of a rear surface 255 of load-bearing member 215, so that the load-bearing member moves easily about the head tube portion when fork assembly 200 is rotated.

Fork assembly 200 may include any suitable headset components configured to facilitate rotation of the fork assembly relative to head tube portion 150. For example, fork assembly 200 may include bearings disposed between head tube portion 150 and lower surface 242, and/or between the head tube portion and fork top 205. Bearing race 251, depicted in FIG. 15, is an example of a headset component.

D. Illustrative Spacers

Figure 17:
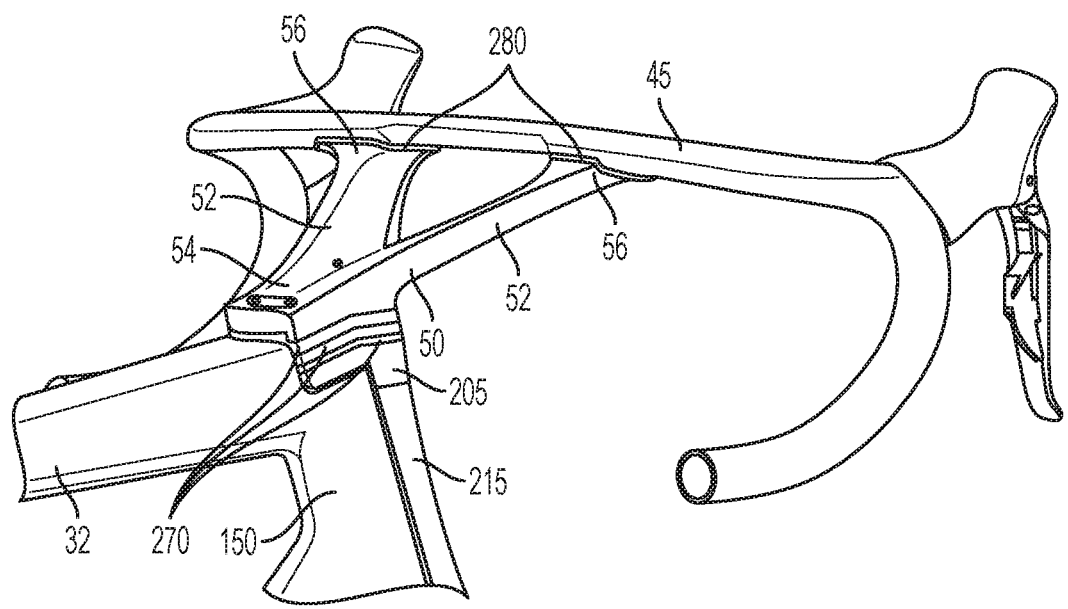
FIG. 17 is an isometric view of an exemplary base bar and v-shaped stem attached to a bicycle frame, showing illustrative spacers in accordance with aspects of the present disclosure.

This section describes illustrative stem spacers 270 and base bar spacers 280, as shown in FIG. 17.

FIG. 17 depicts stem spacers 270 disposed between junction portion 54 of v-shaped stem 50 and fork top 205. Typically, stem spacers 270 are configured to be removably disposed between lower surface 103 of junction portion 54 (see FIG. 7) and upper surface 207 of fork top 205 (see FIG. 11). Stem spacers 270 may be configured to mate and align with upper surface 207 and/or lower surface 103. In some examples, recesses and/or projections disposed on stem spacers 270 are configured to mate with complementary recesses and/or projections disposed on upper surface 207 and/or lower surface 103. Recesses and/or projections on upper surface 207 and lower surface 103 may be configured to mate with each other in the absence of stem spacers 270, as described above.

Fasteners configured to fasten v-shaped stem 50 to fork top 205 may additionally be configured to secure one or more stem spacers 270 between upper surface 207 and lower surface 103. For example, one or more screws and/or bolts may extend through upper surface 207, one or more stem spacers 270, and lower surface 103. Stem spacers 270 are configured to receive cables 115 routed from junction portion 54 into head tube portion 150. For example, stem spacers 270 may include one or more apertures configured to receive cables 115.

In some examples, stem spacers 270 each comprise two or more components configured to fit together about an aperture configured to receive cables 115. In other words, stem spacer 270 is configured to be assembled around cables 115, so that the stem spacer can be installed without removing cables 115 from their ordinary positions. The two or more components of stem spacer 270 may be fitted together by clips, screws, clamps, complementary recesses and projections, and/or any other suitable attachment mechanism.

Stem spacers 270 allow adjustment of a vertical position of base bar 45 relative to fork top 205. Inserting stem spacers 270 between fork top 205 and v-shaped stem 50 increases a vertical distance between base bar 45 and fork assembly 200, and may additionally or alternatively change an angle between the base bar and the fork assembly. In some examples, stem spacers 270 include a set of at least three spacers, each of the three spacers having a different thickness. By selectively inserting different combinations of spacers 270 of varying thicknesses, a user of bicycle 30 may choose between a plurality of different vertical distances between base bar 45 and fork top 205. In this way, a position of base bar 45 may be conveniently adjusted to suit different sizes and/or preferences of one or more bicycle riders.

Base bar spacers 280 may be selectively disposed between spaced-apart locations 80 of base bar 45 and corresponding distal ends 56 of stem members 52 of v-shaped stem 50 to selectively adjust a vertical distance and/or an angle between base bar 45 and v-shaped stem 50. Typically, base bar spacers 280 are configured to be secured between base bar 45 and stem members 52 by nut plates 70. For example, fasteners 90 extending through fastener apertures 92 within distal ends 56 and into bores 75 of nut-plate projections 72 may also pass through base bar spacers 280. A plurality of different fasteners 90 may be provided to allow for different numbers or different thicknesses of base bar spacers 280. In some examples, base bar spacers 280 include, for each of the two stem members 52, at least three base bar spacers having different thicknesses.

Base bar spacers 280 may be configured to allow cables 115 to pass from grooves 100 into stem members 52. For example, the base bar spacers 280 may include apertures and/or grooves configured to receive cables 115. Base bar spacers 280 may each comprise two or more components configured to fit together about cables 115, as described above with reference to stem spacers 270.

Base bar spacers 280 allow adjustment of a vertical position of base bar 45 relative to v-shaped stem 50. As with stem spacers 270, different selections of one or more base bar spacers 280 may allow bicycle 30 to be adapted to suit different rider sizes or rider preferences. Depending on the shapes of base bar spacers 280, stem spacers 270, fork assembly 200, v-shaped stem 50, base bar 45, and/or other components of bicycle 30, insertion of one or more base bar spacers and/or stem spacers may also adjust horizontal distances between the base bar, the v-shaped stem, and/or the fork assembly. Accordingly, these horizontal distances may be selectively adjusted by inserting a selected combination of base bar spacers 280 and/or stem spacers 270.

In some examples, stem spacers 270 and/or base bar spacers 280 are configured to adjust an angle between base bar 45 and v-shaped stem 50 and/or an angle between the v-shaped stem and fork top 205. For example, the spacers may be wedge-shaped. Spacers configured for angular adjustment (e.g., for tilting base bar 45) may allow for further fine-tuning rider position on bicycle 30. A plurality of stem spacers 270 and/or base bar spacers 280 each configured for a different amount of angular adjustment may be provided. Spacers configured for angular adjustment may be used in combination with spacers configured for distance adjustment to achieve a desired bicycle geometry.

E. Illustrative Aerobar Extension Assembly

Figure 18:
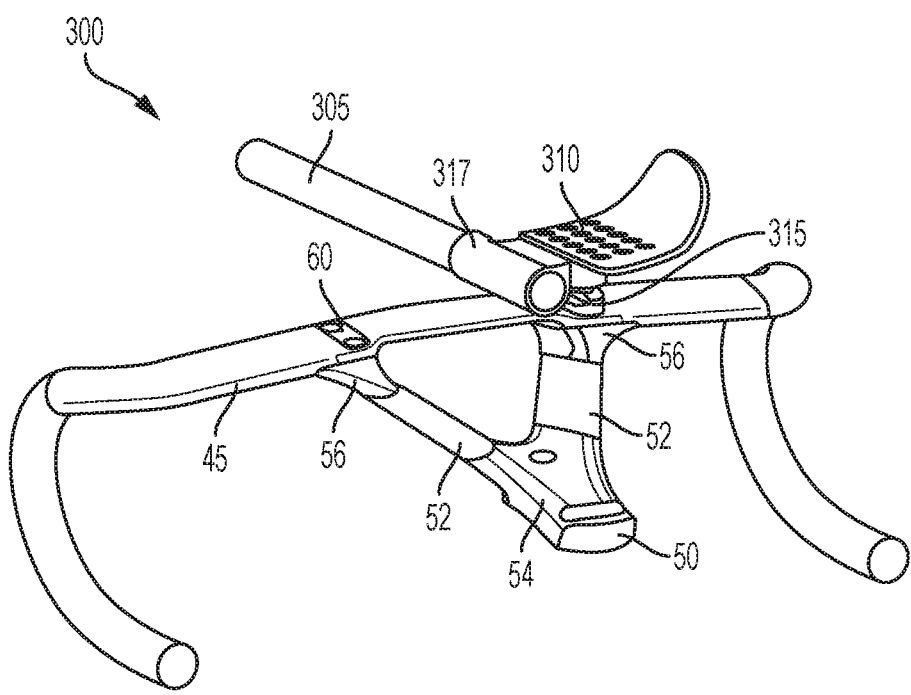
FIG. 18 is an isometric view of an exemplary base bar and v-shaped stem with an illustrative aerobar extension assembly securing the v-shaped stem to the base bar, in accordance with aspects of the present disclosure.
Figure 19:
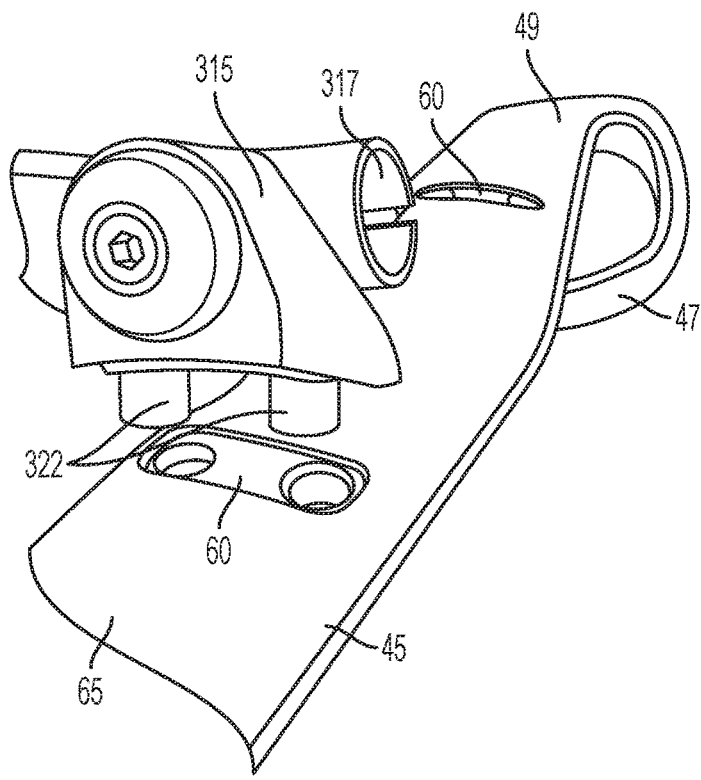
FIG. 19 is a top isometric view of an illustrative engagement portion of the aerobar extension assembly of FIG. 16.
Figure 20:
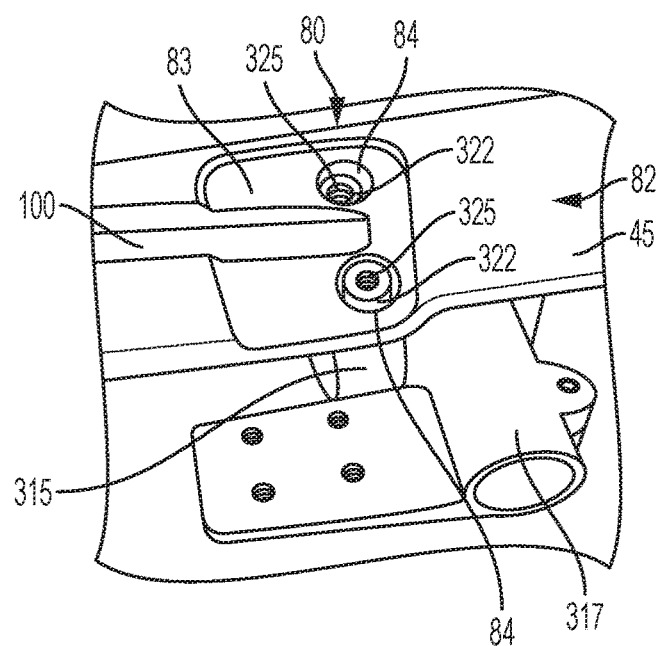
FIG. 20 is a bottom isometric view of the engagement portion of FIG. 17.

As shown in FIGS. 18-20, this section describes an illustrative aerobar extension assembly 300. Aerobar extension assembly 300 is an example of an accessory attachable to base bar 45, as described previously.

FIG. 18 depicts aerobar extension assembly 300 attached to base bar 45 via one of nut plate apertures 60 (not visible) on one side of the base bar. Typically, a second aerobar extension assembly 300 is attached to base bar 45 via the other nut plate aperture 60, but the second (left-hand) aerobar extension assembly is omitted from FIG. 18 for clarity. Alternatively, a single extension assembly or other accessory may attach to base bar 45 via both nut plate apertures 60.

As shown in FIG. 18, aerobar extension assembly 300 includes an elongate extension portion 305, an armrest pad 310, and an engagement portion 315 (also called an attachment portion) configured to attach the extension portion and the pad to base bar 45. Engagement portion 315 also secures one of the stem members 52 to base bar 45, as described further below.

A rider of bicycle 30 may grip extension portion 305 in one hand and rest a forearm on pad 310. Using aerobar extension assembly 300 in this way may help the rider to assume an aerodynamic position on the bicycle. In the example depicted in FIG. 18, extension portion 305 is substantially straight, but in other examples, the extension portion may be curved or angled. For example, extension portion 305 may be J-shaped, S-shaped, or shaped in any other suitable geometry.

In some examples, extension portion 305 is connected to engagement portion 315 by a sleeve 317 attached to the engagement portion and configured to receive the extension portion. Sleeve 317 may be configured to selectively receive any one of a plurality of interchangeable extension portions 305, or a single extension portion which can slide within sleeve 317 to adjust the overall length of the aerobar extension.

Engagement portion 315 is configured to secure aerobar extension assembly 300 to base bar 45 while also securing one of the stem members 52 to the base bar. Accordingly, in some examples, engagement portion 315 includes features similar to nut plate 70 (see FIGS. 3-5).

FIGS. 19-20 depict an illustrative embodiment of engagement portion 315 having engagement projections 322. Like nut-plate projections 72 (see FIGS. 3-5), engagement projections 322 extend through complementary openings in nut-plate apertures 60 in top portion 65 of base bar 45 toward bottom-surface apertures 84 in bottom surface 82 of the base bar. FIG. 20 depicts engagement projections 322 extending through bottom surface 82 at depression 83. Engagement projections 322 may each have a respective bore 325 configured to receive a fastener, such as fastener 90. The fasteners retain v-shaped stem 50 against bottom surface 82 by passing through fastener apertures 92 within distal ends 56 of stem members 52, and being securely received in bores 325 of engagement projections 322. In this way, engagement portion 315 secures v-shaped stem 50 and aerobar extension assembly 300 against base bar 45.

In the example depicted in FIGS. 19-20, engagement portion 315 includes two engagement projections 322. In other examples, there may be more than two or fewer than two engagement projections 322. In some examples, the number of engagement projections 322 is the same as the number of complementary openings in nut-plate apertures 60 corresponding to the associated spaced-apart location 80.

In the example depicted in FIGS. 19-20, nut plate 70 is absent from base bar 45 while aerobar extension assembly 300 is attached to the base bar. Alternatively, or additionally, nut plate 70 may be used to attach aerobar extension assembly 300 to base bar 45. For example, engagement portion 315 may include apertures configured to align with nut-plate apertures 60, and nut-plate projections 72 may extend through the apertures of the engagement portion into nut-plate apertures 60 and bottom-surface apertures 84. Fasteners 90 may then fasten v-shaped stem 50 and aerobar extension assembly 300 to base bar 45. In other words, nut-plate projections 72 rather than engagement projections 322 may attach aerobar extension assembly 300 and v-shaped stem 50 to base bar 45. Engagement projections 322 may be omitted in these examples.

F. Illustrative Combinations and Additional Examples

This section describes additional aspects and features of handlebar assemblies having v-shaped stems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A bicycle handlebar assembly, comprising a base bar; and a v-shaped stem, selectively attachable to the base bar, including a pair of stem members diverging from a junction portion; each stem member having an aperture near a distal end configured to receive one or more of the control cables from a bottom surface of the base bar into a hollow interior of the corresponding stem member; and the junction portion of the stem having an aperture for routing the control cables from the stem members into a head tube portion of a bicycle frame.

A1. The bicycle handlebar assembly of paragraph A0, wherein the base bar includes a pair of nut plate apertures disposed along a top portion of the base bar, each nut plate aperture configured to receive either a retaining nut plate for securing one of the stem members to the base bar, or an attachment portion of an aerobar extension configured to secure the aerobar extension to the base bar while also securing one of the stem members to the base bar.

A2. The bicycle handlebar assembly of paragraph A0, further comprising means for securing the stem to the base bar.

A3. The bicycle handlebar assembly of paragraph A2, further comprising means for attaching aerodynamic bar extensions to a top portion of the base bar.

A4. The bicycle handlebar assembly of any one of paragraphs A0 through A3, further comprising a fork assembly configured to fit partially within the head tube portion of the bicycle frame, the fork assembly including (i) a top aperture configured to receive the control cables from the stem members, (ii) a load-bearing member disposed at a front surface of the fork assembly, (iii) a preload tensioning rod disposed along an axis of rotation of the fork assembly, and (iv) a hollow portion disposed around the tensioning rod and configured to accommodate the control cables as they pass through the head tube portion.

A5. The bicycle handlebar assembly of paragraph A4, further comprising at least one spacer configured to fit between a lower surface of the junction portion of the stem and an upper surface of the fork assembly, wherein the at least one spacer increases a vertical distance between the base bar and the fork assembly.

A6. The bicycle handlebar assembly of any one of paragraphs A4 through A5, further comprising a bicycle frame including a head tube having a front surface with a shape complementary to a shape of a rear surface of the load bearing member of the fork assembly, and an aperture in the head tube configured to receive at least some of the control cables from the fork assembly into an interior portion of the bicycle frame.

B0. A bicycle handlebar assembly, comprising a base bar including means for routing bicycle control cables from shifter assemblies of the bicycle disposed at lateral edge portions of the base bar to a pair of spaced apart locations symmetrically disposed along a bottom surface of the base bar; and a stem including a pair of diverging stem members extending from a junction portion in a v-shaped configuration; wherein the stem is selectively attachable to the base bar, wherein each stem member has an aperture at its distal end which is configured to receive at least one of the control cables from a complementary one of the spaced apart locations into a hollow interior of the stem member, and wherein the junction portion of the stem has an aperture for routing the control cables from the stem members into a head tube portion of a bicycle frame.

B1. The bicycle handlebar assembly of paragraph B0, further comprising a pair of nut plate apertures symmetrically disposed along a top surface of the base bar, wherein each nut plate aperture is configured to receive a nut plate that engages a corresponding one of the stem members through the base bar and thereby securely fastens the corresponding stem member to the base bar.

B2. The bicycle handlebar assembly of paragraph B1, wherein each nut plate aperture is configured to receive an engagement portion of an aerobar extension assembly which includes (i) means for attaching the aerobar extension assembly to the base bar and (ii) means for securely fastening the corresponding stem member to the base bar.

B3. The bicycle handlebar assembly of any one of paragraphs B0 through B2, further comprising a fork assembly including (i) a top aperture configured to receive the control cables from the stem members, (ii) a load-bearing member disposed at a front surface of the fork assembly, and (iii) a hollow portion disposed adjacent to the load-bearing member and configured to accommodate the control cables as they pass through the fork assembly.

B4. The bicycle handlebar assembly of paragraph B3, further comprising at least one spacer configured to be removably disposed between a lower surface of the stem and an upper surface of the fork assembly to adjust a vertical distance between the base bar and the fork assembly.

B5. The bicycle handlebar assembly of paragraph B4, wherein the at least one spacer includes a set of at least three spacers of varying thicknesses.

C0. A bicycle handlebar assembly, comprising a base bar including grooves symmetrically disposed along a bottom surface of the base bar, each groove shaped to accommodate control cables of a bicycle, and each groove extending to a depression formed in the bottom surface of the base bar; a stem, selectively removable from the base bar, including a pair of diverging stem members extending from a junction portion in a v-shaped configuration, each stem member including a distal end configured to mate and align with one of the depressions formed in the bottom surface of the base bar, and the distal end of each stem member further including an aperture configured to receive control cables from one of the grooves of the base bar into a hollow interior portion of the corresponding stem member; and a pair of nut plate receiving apertures symmetrically disposed along a top surface of the base bar and each configured to receive either a retaining nut plate for securing one of the stem members to the base bar, or an attachment portion of an aerobar extension configured to secure the aerobar extension to the top surface of the base bar while also securing one of the stem members to the base bar.

C1. The bicycle handlebar assembly of paragraph C0, further comprising a bayonet-style fork assembly, wherein the junction portion of the stem includes an aperture configured to mate and align with an aperture of the fork assembly.

C2. The bicycle handlebar assembly of paragraph C1, wherein the fork assembly includes a fork top configured to mate and align with the junction portion of the stem, a front load-bearing portion, a central tensioning rod, a space around the tensioning rod to accommodate passage of control cables, and a pair of fork blades, and wherein the load-bearing portion extends between the fork top and the fork blades.

C3. The bicycle handlebar assembly of paragraph C2, wherein the front load-bearing portion of the fork assembly is configured to rotate with rotation of the base bar, external to any tubes of the bicycle.

C4. The bicycle handlebar assembly of any one of paragraphs C2 through C3, further comprising a plurality of spacers of varying thicknesses, each configured to mate and align with the junction portion of the stem and with the fork top, and to fit between the junction portion of the stem and the fork top to allow adjustment of a vertical position of the base bar relative to the fork top.

D0. A bicycle handlebar assembly, comprising a base bar; a stem, selectively removable from the base bar, including a pair of hollow diverging stem members extending from a junction portion in a v-shaped configuration; means for routing control cables of a bicycle from the base bar and into the stem; and means for securing the stem to a bottom surface of the base bar; and means for selectively securing aerobar extensions to a top surface of the base bar.

D1. The bicycle handlebar assembly of paragraph D0, further comprising means for attaching the stem to a fork assembly; and means for increasing vertical separation between the base bar and the fork assembly.

Advantages, Features, and Benefits

The different embodiments and examples of the bicycle handlebar assembly described herein provide several advantages over assemblies. For example, illustrative embodiments and examples described herein allow a handlebar assembly having an aerodynamic stem.

Additionally, and among other benefits, illustrative embodiments and examples described herein allow a handlebar assembly having increased stiffness and more precise handling.

Additionally, and among other benefits, illustrative embodiments and examples described herein allow bicycle cables to be routed from control assemblies into a bicycle frame such that the cables are curved along wide angles with gradual changes in direction, avoiding sharp angles and rapid changes in direction. This routing allows lower friction and better performance for mechanical cables.

Additionally, and among other benefits, illustrative embodiments and examples described herein allow bicycle cables to be routed through an upper bearing race of the fork assembly, which may reduce the travel induced in the cables by rotation of the base bar (e.g., when the bicycle is steered).

Additionally, and among other benefits, illustrative embodiments and examples described herein allow for a vertical distance and/or an angle between the base bar and the fork assembly to be easily adjusted to suit the requirements and preferences of different riders and/or different riding conditions.

Additionally, and among other benefits, illustrative embodiments and examples described herein allow for a stem to be fastened to a base bar of a handlebar assembly by an attachment portion of an attached aerobar extension assembly. This allows a lighter overall weight compared to systems in which two or more separate attachment mechanisms are used to fasten the aerobar extension and the stem to the handlebar.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. A bicycle steering assembly, comprising:
a handlebar assembly, including a base bar and a stem selectively attachable to the base bar;
a fork assembly, including:
a fork top, rigidly connectable to the stem;
a load-bearing member disposed at a front portion of the fork assembly extending between the fork top and one or more fork blades, and configured to act as an external steerer for the bicycle; and
a tensioning rod disposed behind the load-bearing member and extending from a lower surface of the fork assembly to the fork top; wherein the tensioning rod is configured to be disposed within a head tube portion of a bicycle frame; and
a preload insert, including:
a bore configured to receive an end portion of the tensioning rod;
an upper portion configured to be disposed at an upper opening of the head tube portion of the bicycle frame; and a steering stop configured to engage internal walls of the head tube portion of the bicycle frame when rotated to a predetermined position, thereby preventing further rotation of the handlebar assembly and the fork assembly.

2. The bicycle steering assembly of claim 1, wherein the upper portion of the preload insert includes at least one aperture configured to allow a control cable to pass into the head tube portion.

3. The bicycle steering assembly of claim 1, wherein the predetermined position is chosen to prevent the handlebar assembly from rotating far enough to contact the bicycle frame.

4. The bicycle steering assembly of claim 1, wherein the predetermined position is chosen to prevent control cables of the bicycle from being strained.

5. The bicycle steering assembly of claim 1, wherein upper portion of the preload insert is disposed within an aperture of the fork top, and the aperture is configured to be tightened around the preload insert to secure the preload insert within the fork top.

6. The bicycle steering assembly of claim 1, wherein the upper portion of the preload insert includes three apertures configured to route a rear brake cable, a rear derailleur cable, and a front derailleur cable into the head tube portion, respectively.

7. The bicycle steering assembly of claim 1, further comprising a first bearing disposed between the head tube portion and a lower surface of the fork assembly, and a second bearing disposed between the head tube portion and the fork top.

8. A bicycle steering assembly, comprising:
a handlebar assembly, including;
a base bar; and
a stem, selectively removable from the base bar, including a pair of diverging stem members extending from a junction portion in a v-shaped configuration, each stem member including a distal end configured to mate and align with a depression formed in the bottom surface of the base bar;
a fork assembly, including:
a fork top, rigidly connectable to the junction portion of the stem;
a load-bearing member disposed at a front portion of the fork assembly extending between the fork top and one or more fork blades and configured to act as an external steerer for the bicycle; and
a tensioning rod disposed behind the load-bearing member and extending from a lower surface of the fork assembly to the fork top; wherein the tensioning rod is configured to be disposed within a head tube portion of a bicycle frame; and
a preload insert comprising;
a bore configured to receive an end portion of the tensioning rod;
an upper portion configured to be disposed on an upper bearing race located at an upper opening of the head tube portion of the bicycle frame; and
a steering stop having a size and a shape configured to engage internal walls of the head tube portion of the bicycle frame when rotated to a predetermined position.

9. The bicycle steering assembly of claim 8, wherein the upper portion of the preload insert includes an aperture configured to allow a control cable to pass into the head tube portion.

10. The bicycle steering assembly of claim 8, wherein the predetermined position is chosen to prevent the handlebar assembly and the fork assembly from rotating far enough to contact and damage the bicycle frame.

11. The bicycle steering assembly of claim 8, wherein the predetermined position is chosen to prevent control cables of the bicycle from being strained.

12. The bicycle steering assembly of claim 8, further comprising a pair of apertures disposed along a top portion of the base bar, each aperture configured to receive an attachment portion of an aerobar extension configured to secure the aerobar extension to the base bar.

13. The bicycle steering assembly of claim 8, further comprising a pair of apertures disposed along a top portion of the base bar, each aperture configured to receive a retaining plate for securing one of the stem members to the base bar.

14. The bicycle steering assembly of claim 8, wherein the steering stop projects from a side of a lower portion of the preload insert.

15. A bicycle steering assembly, comprising:
a handlebar assembly, including:
a base bar; and
a stem, selectively removable from the base bar, including a pair of hollow diverging stem members extending from a junction portion in a v-shaped configuration;
a fork assembly, including:
a fork top, rigidly connectable to the junction portion of the stem;
a load-bearing member disposed at a front portion of the fork assembly and extending between the fork top and one or more fork blades; and
a tensioning rod disposed behind the load-bearing member and configured to be disposed within a head tube portion of a bicycle frame; and
a preload insert, including:
a bore configured to receive an end portion of the tensioning rod;
an upper portion configured to be disposed at an upper opening of the head tube portion of the bicycle frame; and
means for preventing the handlebar assembly from rotating far enough to contact and damage the bicycle frame, wherein the means for preventing the handlebar assembly from rotating far enough to contact and damage the bicycle frame includes a steering stop configured to engage internal walls of the head tube portion of the bicycle frame when rotated to a predetermined position.

16. The bicycle steering assembly of claim 15, wherein the steering stop projects from a side of the preload insert.

17. The bicycle steering assembly of claim 16, wherein the steering stop is disposed at a bottom portion of the preload insert.

* * * * *